United States Patent
Lee et al.

(10) Patent No.: US 10,401,957 B2
(45) Date of Patent: Sep. 3, 2019

(54) SYSTEM AND METHOD FOR PROVIDING SIMULATED ENVIRONMENT

(71) Applicant: HTC Corporation, Taoyuan (TW)

(72) Inventors: Hsin-Hao Lee, Taoyuan (TW); Ching-Hao Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/823,607

(22) Filed: Nov. 28, 2017

(65) Prior Publication Data

US 2018/0292899 A1 Oct. 11, 2018

Related U.S. Application Data

(60) Provisional application No. 62/482,207, filed on Apr. 6, 2017.

(51) Int. Cl.
| | |
|---|---|
| G06F 3/01 | (2006.01) |
| G06T 19/20 | (2011.01) |
| G02B 27/00 | (2006.01) |
| H04N 13/344 | (2018.01) |
| H04N 13/279 | (2018.01) |
| H04N 13/383 | (2018.01) |
| G02B 27/01 | (2006.01) |

(52) U.S. Cl.
CPC ......... *G06F 3/013* (2013.01); *G02B 27/0093* (2013.01); *G06F 3/011* (2013.01); *G06F 3/012* (2013.01); *G06T 19/20* (2013.01); *H04N 13/279* (2018.05); *H04N 13/344* (2018.05); *H04N 13/383* (2018.05); *G02B 27/017* (2013.01)

(58) Field of Classification Search
CPC combination set(s) only.
See application file for complete search history.

(56) References Cited

U.S. PATENT DOCUMENTS

| | | |
|---|---|---|
| 9,363,569 B1 | 6/2016 | van Hoff et al. |
| 2013/0050432 A1 | 2/2013 | Perez et al. |
| 2016/0173865 A1 | 6/2016 | Park |

FOREIGN PATENT DOCUMENTS

| | | |
|---|---|---|
| CN | 105653012 A | 6/2016 |
| TW | 201516850 A | 5/2015 |
| TW | 201643506 A | 12/2016 |
| WO | 2016014878 A1 | 1/2016 |

OTHER PUBLICATIONS

Corresponding extended European search report dated May 7, 2018.
Corresponding Taiwan office action dated Feb. 23, 2019.

*Primary Examiner* — Van N Chow
(74) *Attorney, Agent, or Firm* — CKC & Partners Co., LLC (57) ABSTRACT

Present disclosure relates to a system for providing a simulated environment and a method thereof. The system comprises a first wearable device and a computing unit. The first wearable device is configured to output a first scenario of the simulated environment, wherein a virtual object is being displayed in the first scenario. The first wearable device is further configured to track a first direction of a first object and provide a first indicator in the first scenario according to the first direction. The computing unit is configured to determine which portion of the virtual object is pointed by the first indicator, to store first information corresponding to the portion of the virtual object being pointed, and to perform an operation according to the first information.

18 Claims, 5 Drawing Sheets

SYSTEM AND METHOD FOR PROVIDING SIMULATED ENVIRONMENT

CROSS-REFERENCE TO RELATED APPLICATION

This application claims priority to U.S. Provisional Application Ser. No. 62/482,207, filed on Apr. 6, 2017, which is herein incorporated by reference.

BACKGROUND

Field of Invention

Present disclosure relates to a system and a method for providing a simulated environment.

Description of Related Art

Virtual reality technology is very powerful when being applied to a group of people, especially when being applied for holding a conference or a workshop. It is much intuitive for having a prototype or a blueprint being presented in a visible three dimensional space rather than only on a two dimensional picture. However, there are still some unsolved problems for providing a virtual reality environment to multiple users located in different places.

SUMMARY

The disclosure relates to a system for providing a simulated environment. The system comprises a first wearable device and a computing unit. The first wearable device is configured to output a first scenario of the simulated environment, wherein a virtual object is being displayed in the first scenario. The first wearable device is further configured to track a first direction of a first object and provide a first indicator in the first scenario according to the first direction. The computing unit is configured to determine which portion of the virtual object is pointed by the first indicator, to store first information corresponding to the portion of the virtual object being pointed, and to perform an operation according to the first information.

Another aspect of present disclosure is to provide a method for providing a simulated environment. The method comprises following steps: outputting, by a first wearable device, a first scenario of the simulated environment, wherein a virtual object is displayed in the first scenario; tracking, by the first wearable device, a first direction of a first object; providing, by the first wearable device, a first indicator in the first scenario according to the first direction; determining, by a computing unit, which portion of the virtual object is pointed by the first indicator; determining, by the computing unit, first information corresponding to the portion of the virtual object being pointed; and performing, by the computing unit, an operation according to the first information.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1:
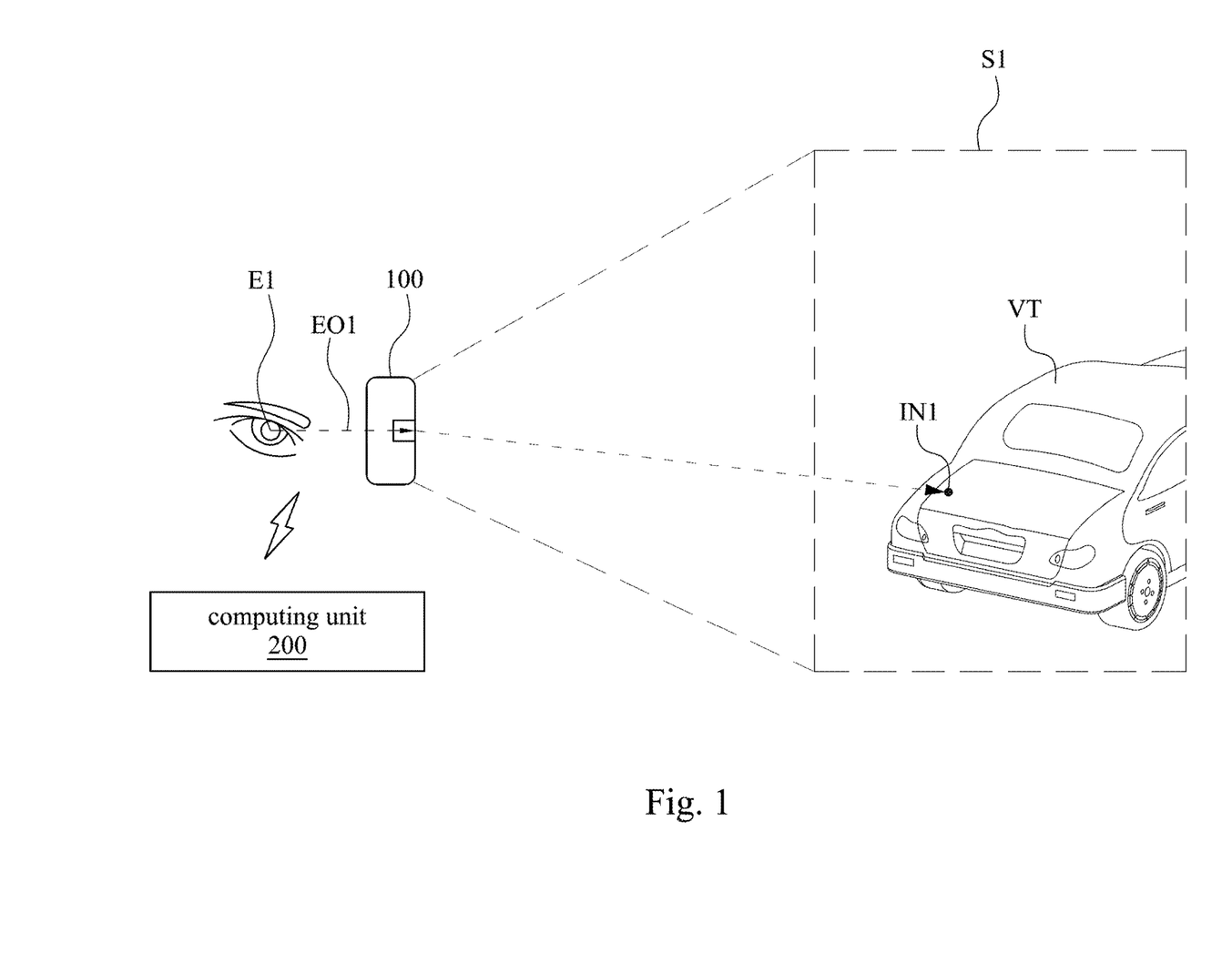
FIG. 1 is a schematic diagram of a system for providing a simulated environment according to some embodiments of present disclosure.

FIG. 1 is a schematic diagram of a system for providing a simulated environment according to some embodiments of present disclosure. The simulated environment is an environment built with virtual objects illustrated by computing units, for example, may be a virtual reality environment, an augmented reality environment or a mixed reality environment. As shown in FIG. 1, a first wearable device 100 is in communication with a computing unit 200. In an embodiment, the first wearable device 100 is carried by a first user (now shown). The first wearable device 100 is configured to output a first scenario S1 of a virtual reality environment to the first user, wherein the first scenario may be updated according to the viewing that changed in response to the movement of the first user. The first wearable device 100 may receive signals from the computing unit 200 for displaying and updating the first scenario S1. The first scenario S1 is being displayed on the display (now shown) of the first wearable device 100 instead of being projected to the real world. The first scenario S1 being displayed shows a partial view of the virtual reality environment from a viewpoint of the first user.

As illustrated in FIG. 1, a virtual roadster VT is presented in the virtual environment. Through the first scenario S1, the first user may see the tail of the virtual roadster VT with eyeball E1. In the embodiment, the first wearable device 100 may track a first direction EO1 of the eyeball E1 with an optical sensor (not shown) configured on the first wearable device 100. The first wearable device 100 may provide a first indicator IN1 in the first scenario S1 according to the first direction EO1. The first direction EO1 is the direction extended from the pupil of the eyeball E1, wherein the first direction EO1 is perpendicular to the surface of the pupil. The first indicator IN1 is provided for indicating where the first user is looking at in the first scenario S1. As can be seen in the figure, the first indicator IN1 is pointed on the left side of the tail of the virtual roadster VT, which indicates that the first wearable device 100 tracks the eyeball E1 is pointing to the point of the first indicator IN1.

In the embodiment, the computing unit 200 is configured to determine which portion of the virtual roadster VT is pointed by the first indicator IN1, and further to store first information corresponding to the portion being pointed. As shown in FIG. 1, the computing unit 200 may determine the left side of the tail of the virtual roadster VT is pointed by the first indicator IN1, so the computing unit 200 may store first information corresponding to the left side of the tail of the virtual roadster VT. The first information may be a frequency count regarding to which portion of the virtual roadster VT is pointed by the first indicator IN1.

For example, when the first indicator IN1 is being determined as pointing to a first portion of the virtual roadster VT, the frequency count regarding to that first portion is being pointed may be stored. And when the first indicator IN1 is being determined as pointing to a second portion of the virtual roadster VT, the frequency count regarding to that second portion is being pointed may be stored. As such, through the first information, it can be known that how many times the first user is looking at a specific portion of the virtual roadster VT.

In the embodiment, the first information may also be an image or a video regarding to the portion being pointed by the first indicator IN1 in the first scenario S1. For example, when the first indicator IN1 is being determined as pointing to a first portion of the virtual roadster VT, the computing unit 200 may trigger the first wearable device 100 to capture an instant image of the first scenario S1. The instant image being captured may indicate that the left side of the tail of the virtual roadster VT is being pointed by the first indicator IN1.

In the embodiment, when the first information is stored by the computing unit 200, the current position of the first wearable device 100 with respect to the space it is located in may be recorded as well. Through this approach, the computing unit 200 may determine that the first user is looking at the specific portion of the virtual roadster VT from which viewpoint. In some embodiment, the first indicator IN1 is merely an indication to the first wearable device 100 and the computing unit 200 so the first user may not observe the first indicator IN1 in the first scenario S1.

In the embodiment, when the computing unit 200 stores the first information corresponding to the portion being pointed, the computing unit 200 may perform an operation according to the first information. For example, the computing unit 200 may highlight the portion of the virtual roadster VT with specific marks or colors, and the first user may observe the portion being highlighted in the first scenario S1. In another example, the computing unit 200 may conceal the portion of the virtual roadster VT with virtual objects or colors, and the first user may not observe the portion being concealed in the first scenario S1. In some other examples, the computing unit 200 may reshape the portion of the virtual roadster VT in the first scenario S1, or the computing unit 200 may send a notification regarding the portion of the virtual object.

Figure 2:
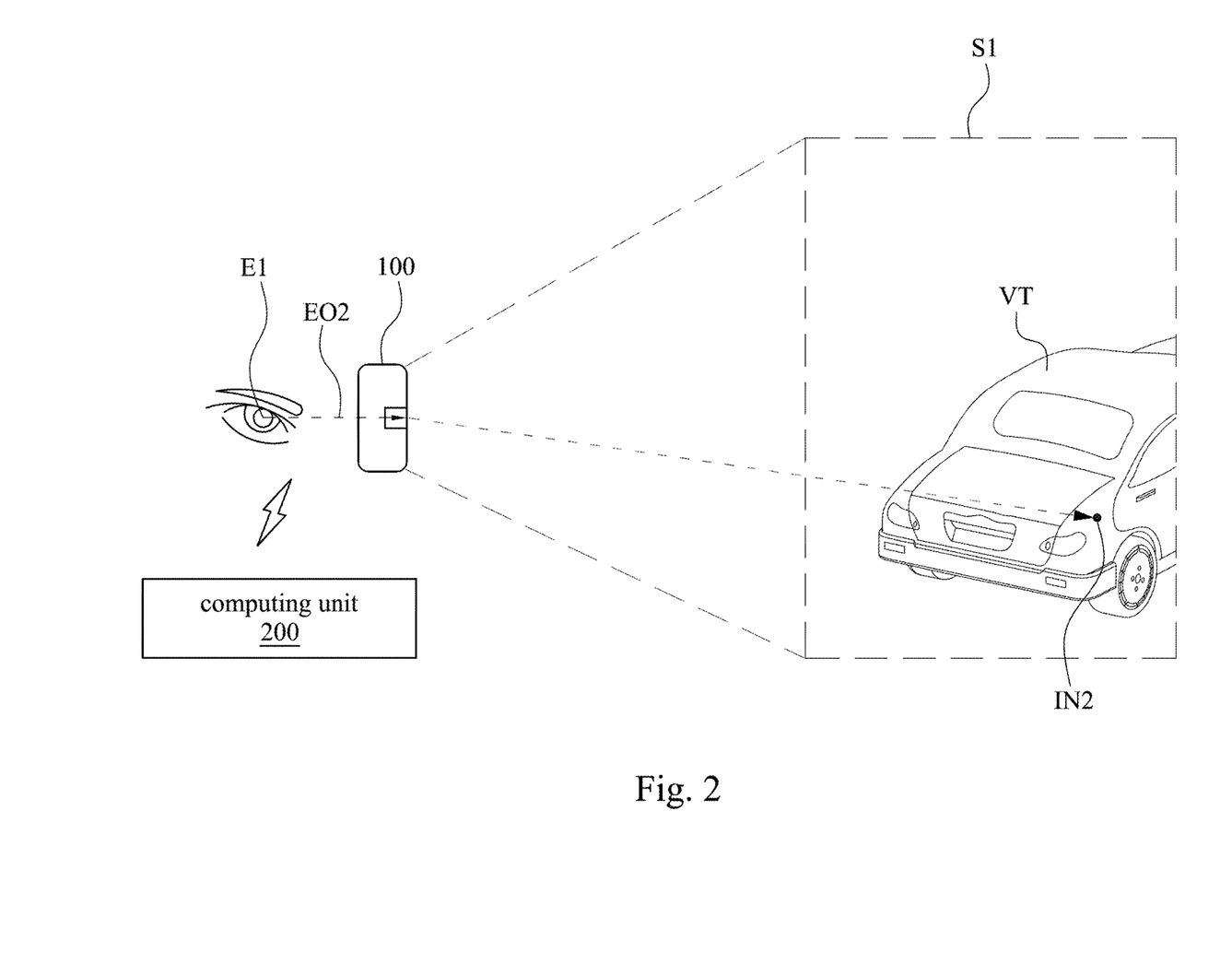
FIG. 2 is a schematic diagram of a system for providing a simulated environment according to the embodiment shown in FIG. 1.

FIG. 2 is a schematic diagram of a system for providing a simulated environment according to the embodiment shown in FIG. 1. As shown in FIG. 2, in the embodiment, the same first scenario S1 is outputted by the first wearable device 100, and the tail of the virtual roadster VT is displayed in the first scenario S1 as well. In the embodiment, the first wearable device 100 may track a second direction EO2 of the eyeball E1 and provide a second indicator IN2 in the first scenario S1 according to the second direction EO2. The second direction EO2 is the direction extended from center of the eyeball E1 to the pupil of the eyeball E1. The second indicator IN2 is provided for indicating where the first user (not shown) is looking at in the first scenario S1. As can be seen in the figure, the second indicator IN2 is pointed on the right side of the tail of the virtual roadster VT, which indicates that the first wearable device 100 tracks the eyeball E1 is pointing to the point of the second indicator IN2.

In the same manner, in the embodiment, the computing unit 200 is configured to determine which portion of the virtual roadster VT is pointed by the second indicator IN2, and further to store second information corresponding to the portion being pointed. As shown in FIG. 2, the computing unit 200 may determine that the right side of the tail of the virtual roadster VT is pointed by the second indicator IN2, so the computing unit 200 may store second information corresponding to the right side of the tail of the virtual roadster VT. The second information may be a frequency count regarding to which portion of the virtual roadster VT is pointed by the second indicator IN2. However, according to the embodiment of FIG. 1, since the first information and the second information are both frequency counts regarding to which portion of the virtual roadster VT is being pointed by indicators, if the first indicator IN1 and the second indicator IN2 are being determined as pointing to the same portion of the virtual roadster VT, the first information and the second information may be accumulated. As such, through analyzing the first information and the second information, it can be known that the first user likes or dislikes some specific portions of the virtual roadster VT.

In the embodiment, when the computing unit 200 stores the first information and the second information, the computing unit 200 may perform an operation according to the first information and the second information. For example, the computing unit 200 may highlight or conceal the portion of the virtual roadster VT, and the first user may observe the portion being highlighted or hidden in the first scenario S1.

Figure 3:
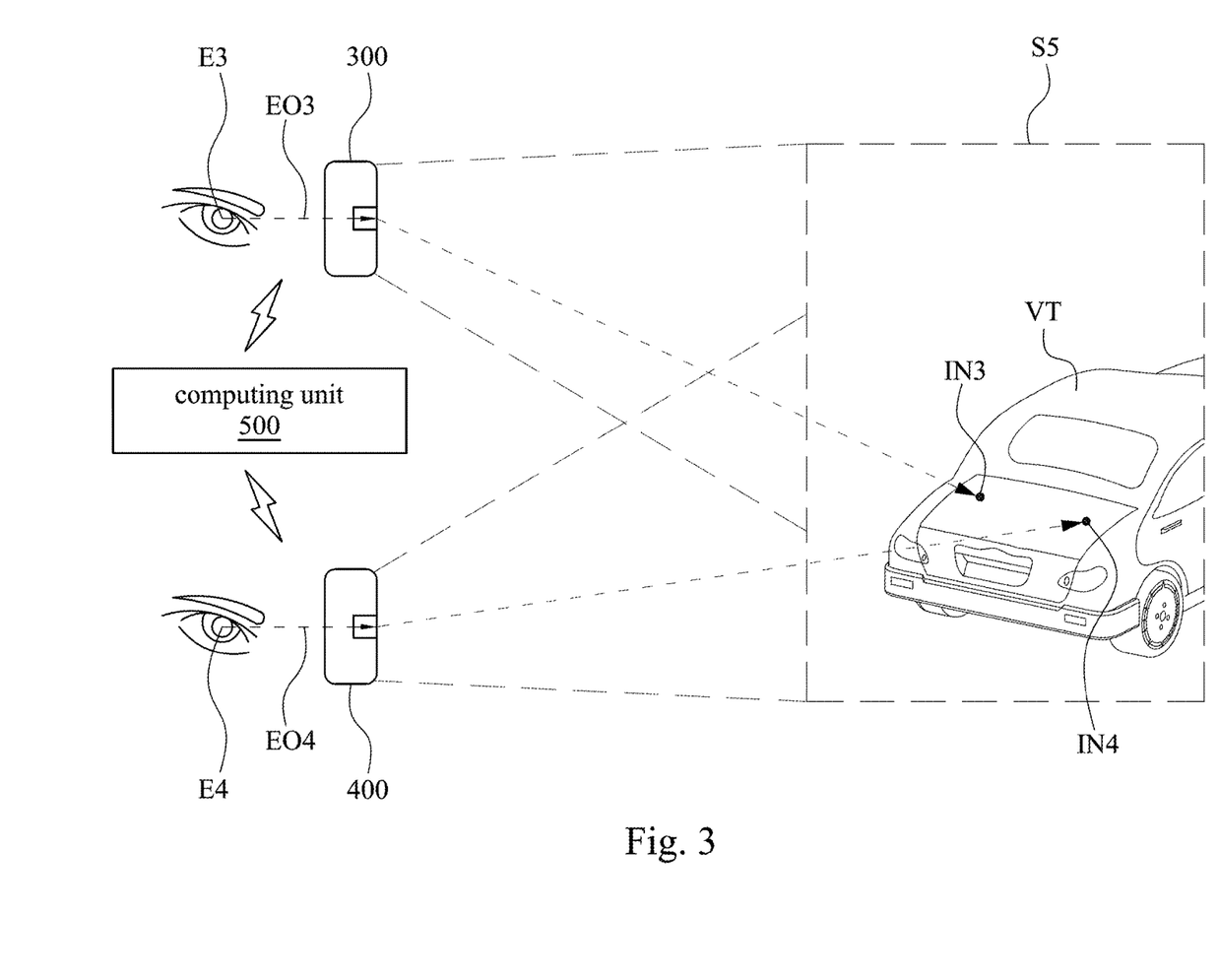
FIG. 3 is a schematic diagram of a system for providing a simulated environment according to some embodiments of present disclosure.

FIG. 3 is a schematic diagram of a system for providing a simulated environment according to some embodiments of present disclosure. As shown in FIG. 3, a third wearable device 300 and a fourth wearable device 400 is in communication with a computing unit 500. In an embodiment, the third wearable device 300 is carried by a third user and the fourth wearable device 400 is carried by a fourth user. The third wearable device 300 is configured to output a third scenario of a virtual reality environment to the third user, and the fourth wearable device 400 is configured to output a fourth scenario of the virtual reality environment to a fourth user. A virtual roadster VT is displayed in both the third scenario and the fourth scenario. However, since the third user and the fourth user are viewing the virtual roadster VT from similar viewpoints in the virtual reality environment, so what can be observed in the third scenario and the fourth scenario are basically the same, as shown as a scenario S5 in FIG. 3. The scenario S5 being displayed shows a partial view of the virtual reality environment from the viewpoints of the third user and the fourth user.

As illustrated in FIG. 3, the tail of the virtual roadster VT is presented in both the third scenario and the fourth scenario, as shown in the scenario S5. In the embodiment, through the third scenario, the third user may see the tail of the virtual roadster VT with eyeball E3. The third wearable device 300 may track a third direction EO3 of the eyeball E3 and provide a third indicator IN3 in the third scenario according to the third direction EO3. Through the fourth scenario, the fourth user may see the tail of the virtual roadster VT with eyeball E4. The fourth wearable device 400 may track a fourth direction EO4 of the eyeball E4 and provide a fourth indicator IN4 in the fourth scenario according to the fourth direction EO4. It can be seen in scenario S5, the third indicator IN3 is pointing to the left side of the tail of the virtual roadster VT and the fourth indicator IN4 is pointing to the right side of the tail of the virtual roadster VT.

In the embodiment, the computing unit 500 is configured to determine which portion of the virtual roadster VT is pointed by the third indicator IN3 and the fourth indicator IN4. The computing unit 500 is further configured to store third information corresponding to the portion being pointed by the third indicator IN3 and to store fourth information corresponding to the portion being pointed by the fourth indicator IN4. As shown in FIG. 3, the computing unit 500 may determine the left side of the tail of the virtual roadster VT is pointed by the third indicator IN3, so the computing unit 500 may store third information corresponding to the left side of the tail of the virtual roadster VT. The computing unit 500 may determine the right side of the tail of the virtual roadster VT is pointed by the fourth indicator IN4, so the computing unit 500 may store fourth information corresponding to the right side of the tail of the virtual roadster VT.

In the embodiment, when the computing unit 500 stores the third information and the fourth information, the computing unit 200 may perform an operation according to the third information and the fourth information. For example, the computing unit 500 may send a notification about the portion of the virtual roadster VT, and the third user and the fourth user may observe the notification in the scenario S5.

In the embodiment, the third information may be a frequency count regarding to which portion of the virtual roadster VT is pointed by the third indicator IN3, and the fourth information may be a frequency count regarding to which portion of the virtual roadster VT is pointed by the fourth indicator IN4. Since the third information and the fourth information are both frequency counts, so if it is the same portion of the virtual roadster VT being pointed by the third indicator IN3 and the fourth indicator IN4, the third information and the fourth information may be accumulated as fifth information. It is to say, when the computing unit 500 is in communication with several wearable devices, the computing unit 500 may collect the information regarding to which portion of the virtual roadster VT is focused by all the users. Through analyzing the fifth information, it can be known that the third user and the fourth user like or dislike some specific portions of the virtual roadster VT.

In the embodiment, the fifth information may also be an image or a video regarding to the portion being pointed by the third indicator IN3 and the fourth indicator IN4. Furthermore, in some embodiments, a plurality of coordinates may be spread on a surface of the virtual roadster VT in the virtual environment. The computing unit 500 may determine which of the coordinates is pointed by third indicator 1N3 and the fourth indicator 1N4. As such, the computing unit 500 may determine which portion of the virtual roadster VT is being pointed by the third indicator IN3 and the fourth indicator IN4 in a higher accuracy. In some embodiment, the third indicator 1N3 and the fourth indicator IN4 are merely indications to the wearable devices 300, 400 and the computing unit 500. The third user may not observe the third indicator IN3 in the third scenario, and the fourth user may not observe the fourth indicator IN4 in the fourth scenario.

Figure 4:
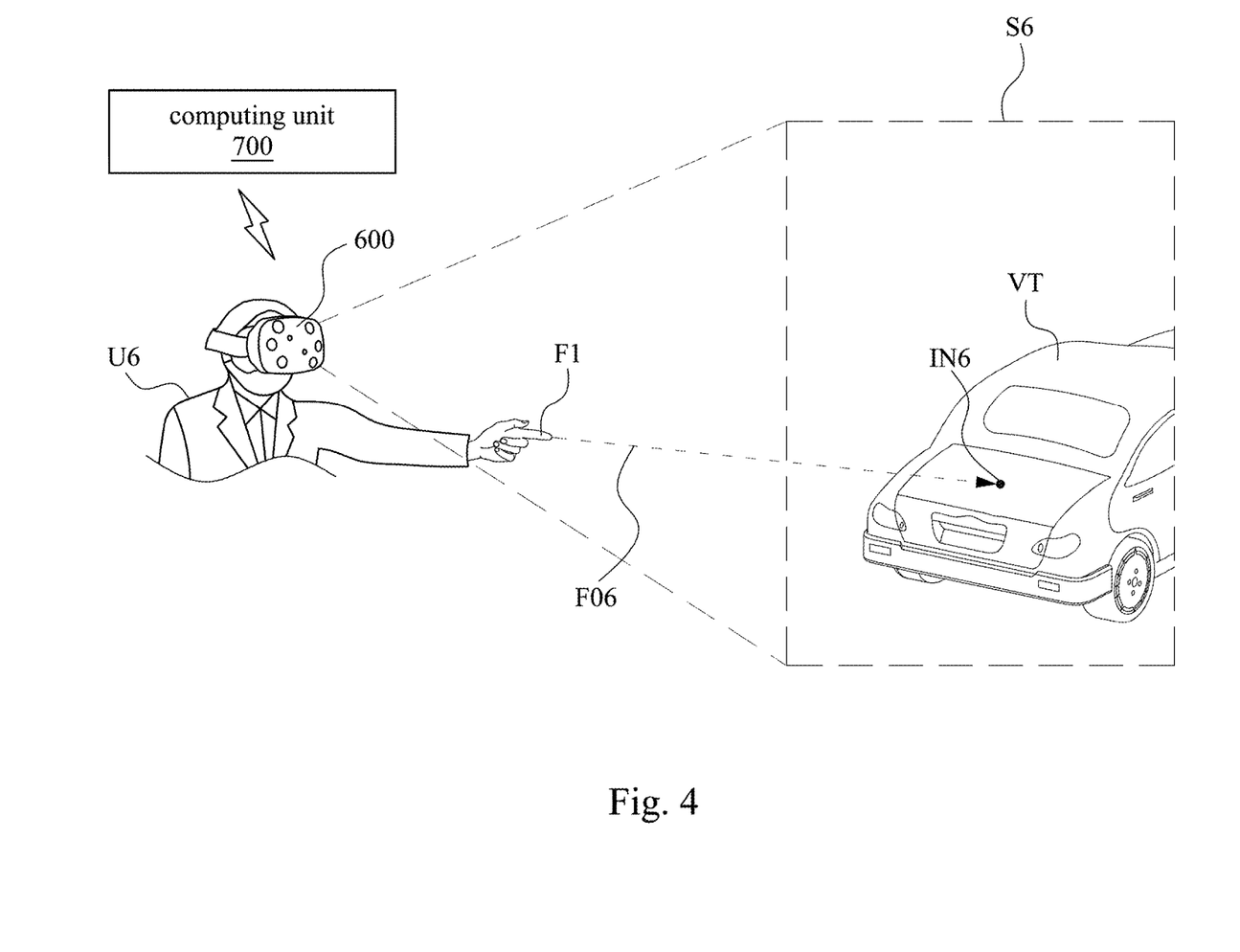
FIG. 4 is a schematic diagram of a system for providing a simulated environment according to some embodiments of present disclosure.

FIG. 4 is a schematic diagram of a system for providing a simulated environment according to some embodiments of present disclosure. As shown in FIG. 4, a sixth wearable device 600 is in communication with a computing unit 700. In an embodiment, the sixth wearable device 600 is carried by a sixth user U6. The sixth wearable device 600 is configured to output a sixth scenario S6 of a virtual reality environment to the sixth user U6. A virtual roadster VT is displayed in the sixth scenario S6.

As illustrated in FIG. 4, the tail of the virtual roadster VT is presented in the sixth scenario S6. In the embodiment, through the sixth scenario S6, the sixth user U6 may see the tail of the virtual roadster VT. The sixth user U6 may point to a specific portion of the virtual roadster VT with his finger F1 when he wants to discuss the portion of the virtual roadster VT. The sixth wearable device 600 may track a sixth direction FO6 of the finger F1 with a camera (not shown) configured on the sixth wearable device 600. The sixth wearable device 600 may provide a sixth indicator IN6 in the sixth scenario S6 according to the sixth direction FO6. It can be seen in sixth direction FO6, the sixth indicator IN6 is pointing to the middle of the tail of the virtual roadster VT. The computing unit 700 may determine that the middle of the tail of the virtual roadster VT is pointed by the sixth indicator IN6 and store sixth information accordingly.

In the embodiment, when the computing unit 700 stores the sixth information, the computing unit 700 may perform an operation according to the sixth information. For example, the computing unit 500 may reshape the portion in the middle of the tail of the virtual roadster VT, and the sixth user U6 may see the reshaped portion in the sixth scenario S6.

As described, not only the direction of user's eyeballs may be collected by the computing unit of present disclosure, so does the direction of user's limbs. Present disclosure provides an approach to collect information about which portion of a virtual object is frequently observed by users or the opposite, the collected information may be used for analysis. Through the analysis, decent or flawed portions of the virtual object may be discovered.

However, it should be understood that the computing unit 300 illustrated in abovementioned figures is only an example. In some embodiments, the computing unit 200, the computing unit 500 and the computing unit 700 may be a CPU, GPU, or some control unit configured in the wearable devices. Depends on which wearable device is configured with the computing unit, the computing unit may determine which portion of the virtual roadster VT is pointed by the indicators and store information accordingly.

Figure 5:
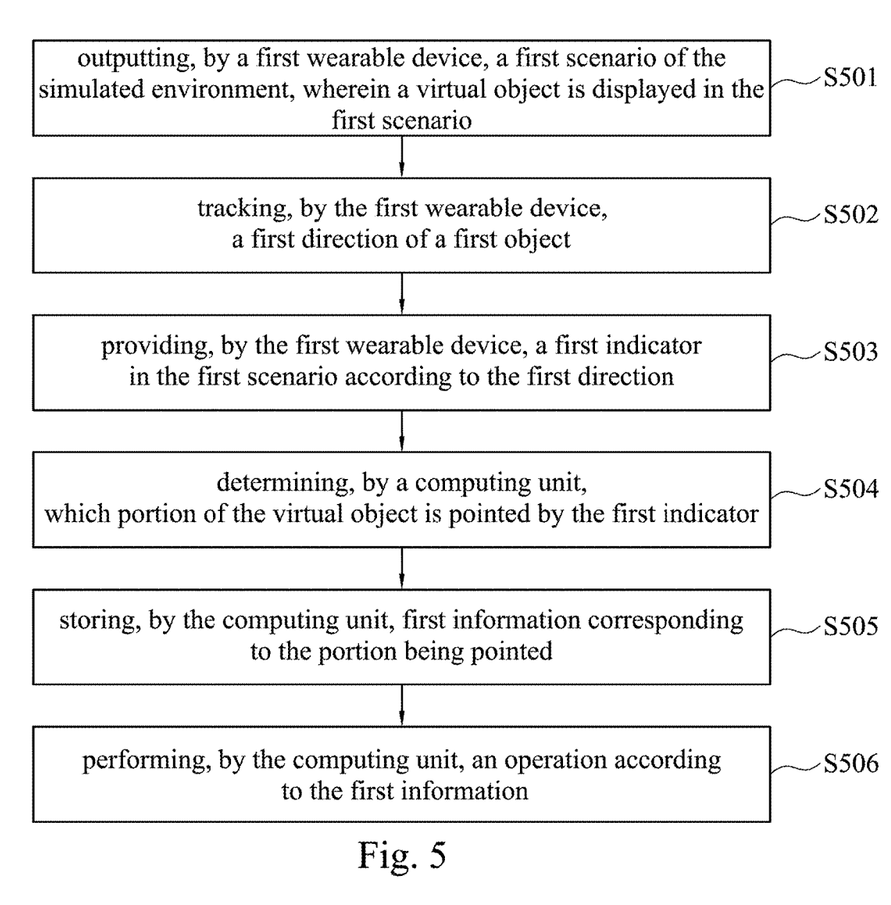
FIG. 5 is a chart of a method for providing a simulated environment according to some embodiments of present disclosure.

FIG. 5 is a flow chart of a method for providing a simulated environment according to some embodiments of present disclosure. The steps of the method will be listed and explained in detail in following segments.

Step S501: outputting, by a first wearable device, a first scenario of the simulated environment, wherein a virtual object is displayed in the first scenario. As shown in the embodiment of FIG. 1 and FIG. 2, the first wearable device 100 may output the first scenario S1 of the virtual reality environment to the first user. In the first scenario S1, the virtual roadster VT may be presented to the first user, and the first user may see the tail of the virtual roadster VT with his eyeball E1.

Step S502: tracking, by the first wearable device, a first direction of a first object. As shown in the embodiment of FIG. 1 and FIG. 2, the first wearable device 100 may track a first direction EO1 of the eyeball E1. The first direction EO1 is the direction extended from center of the eyeball E1 to the pupil of the eyeball E1.

Step S503: providing, by the first wearable device, a first indicator in the first scenario according to the first direction. As shown in the embodiment of FIG. 1 and FIG. 2, according to the first direction EO1, a first indicator IN1 is provided in the first scenario S1. The first indicator IN1 is provided for indicating where the first user is looking at in the first scenario S1. As can be seen in the figure, the first indicator IN1 is pointed on the left side of the tail of the virtual roadster VT, which indicates that the first wearable device 100 tracks the eyeball E1 is pointing to the point of the first indicator IN1.

Step S504: determining, by a computing unit, which portion of the virtual object is pointed by the first indicator. As shown in the embodiment of FIG. 1 and FIG. 2, the computing unit 200 is configured to determine which portion of the virtual roadster VT is pointed by the first indicator IN1, and further to store first information corresponding to the portion being pointed. As shown in FIG. 1, the computing unit 200 may determine the left side of the tail of the virtual roadster VT is pointed by the first indicator IN1. As shown in FIG. 2, the computing unit 200 may determine the right side of the tail of the virtual roadster VT is pointed by the first indicator IN1.

Step S505: storing, by the computing unit, first information corresponding to the portion being pointed. As shown in the embodiment of FIG. 1 and FIG. 2, the computing unit 200 is configured to store information corresponding to the portion of the virtual roadster VT being pointed. As shown in FIG. 1, the computing unit 200 may store first information corresponding to the left side of the tail of the virtual roadster VT. As shown in FIG. 2, the computing unit 200 may store second information corresponding to the right side of the tail of the virtual roadster VT. The first information and the second information may be frequency counts regarding to which portion of the virtual roadster VT is pointed by the first indicator IN1. When the first indicator IN1 is being determined as pointing to the same portion of the virtual roadster VT again, the frequency counts add up.

Step S506: performing, by the computing unit, an operation according to the first information. As shown in the embodiment of FIG. 1 and FIG. 2, when the computing unit 200 stores the first information and the second information corresponding to the portion of the virtual roadster VT being pointed, the computing unit 200 may perform an operation to the portion of the virtual roadster VT according to the first information and the second information. In some embodiments, the operation can be highlighting the portion of the virtual roadster VT, concealing the portion of the virtual roadster VT, reshaping the portion of the virtual roadster VT, or sending a notification regarding the portion of the virtual roadster VT.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system for providing a simulated environment, comprising:
   a first wearable device, configured to output a first scenario of the simulated environment and a virtual object corresponding to a plurality of surface coordinates is displayed in the first scenario, wherein the first wearable device is further configured to track a first direction of a first object and provide a first indicator in the first scenario according to the first direction; and
   a computing unit, configured to determine which of the plurality of surface coordinates of the virtual object is pointed by the first indicator in order to determine which portion of the virtual object is being pointed, the computing unit configured to store first information corresponding to the portion of the virtual object being pointed and to perform an operation according to the first information,
   wherein the operation comprises concealing the portion of the virtual object, reshaping the portion of the virtual object or sending a notification regarding the portion of the virtual object.

2. The system of claim 1, wherein the first information is a frequency count regarding which portion of the virtual object is pointed by the first indicator.

3. The system of claim 1, wherein a position of the first wearable device is recorded by the computing unit when the first information is being stored by the computing unit.

4. The system of claim 1, further comprising:
   a second wearable device, configured to output a second scenario of the simulated environment and the virtual object is displayed in the second scenario, wherein the second wearable device is further configured to track a second direction of a second object and project a second indicator in the second scenario according to the second direction, and wherein the computing unit is configured to determine which portion of the virtual object is pointed by the second indicator and further to store second information corresponding to the portion of the virtual object.

5. The system of claim 4, wherein the first information is a first frequency count regarding to which portion of the virtual object is pointed by the first indicator, and the second information is a second frequency count regarding to which portion of the virtual object is pointed by the second indicator, wherein the first frequency count and the second frequency count are accumulated as a third frequency count when the portion being pointed by the first indicator is the same as the portion being pointed by the second indicator.

6. The system of claim 1, wherein the first information is an image regarding to the portion of the virtual object in the first scenario.

7. The system of claim 1, wherein the first information is a video regarding to the portion of the virtual object in the first scenario.

8. The system of claim 1, wherein the first object is a sphere, wherein the first direction is extended from and perpendicular to a point on the surface of the sphere.

9. The system of claim 1, wherein the first object is an object having a tip, wherein the first direction is extended from the tip of the object.

10. A method for providing a simulated environment, comprising:
outputting, by a first wearable device, a first scenario of the simulated environment, wherein a virtual object corresponding to a plurality of surface coordinates is displayed in the first scenario;
tracking, by the first wearable device, a first direction of a first object;
providing, by the first wearable device, a first indicator in the first scenario according to the first direction;
determining, by a computing unit, which of the plurality of surface coordinates of the virtual object is pointed by the first indicator in order to determine which portion of the virtual object is being pointed;
storing, by the computing unit, first information corresponding to the portion of the virtual object being pointed; and
performing, by the computing unit, an operation according to the first information,
wherein the operation comprises concealing the portion of the virtual object, reshaping the portion of the virtual object or sending a notification regarding the portion of the virtual object.

11. The method of claim 10, wherein the first information is a frequency count regarding which portion of the virtual object is pointed by the first indicator.

12. The method of claim 10, further comprising:
recording, by the computing unit, a position of the first wearable device when the first information is being stored by the computing unit.

13. The method of claim 10, further comprising:
outputting, by a second wearable device, a second scenario of the simulated environment, wherein the virtual object is displayed in the second scenario;
tracking, by the second wearable device, a second direction of a second object;
providing, by the second wearable device, a second indicator in the second scenario according to the second direction;
determining, by the computing unit, which portion of the virtual object is pointed by the second indicator;
storing, by the computing unit, second information corresponding to the portion being pointed; and
performing, by the computing unit, an operation according to the second information.

14. The method of claim 13, wherein the first information is a first frequency count regarding to which portion of the virtual object is pointed by the first indicator, and the second information is a second frequency count regarding to which portion of the virtual object is pointed by the second indicator, wherein the first frequency count and the second frequency count are accumulated as a third frequency count when the portion being pointed by the first indicator is the same as the portion being pointed by the second indicator.

15. The method of claim 10, wherein the first information is an image regarding to the portion of the virtual object in the first scenario.

16. The method of claim 10, wherein the first information is a video regarding to the portion of the virtual object in the first scenario.

17. The method of claim 10, wherein the first object is a sphere, wherein the first direction is extended from and perpendicular to a point on the surface of the sphere.

18. The method of claim 10, wherein the first object is an object having a tip, wherein the first direction is extended from the tip of the object.

* * * * *